US012449273B2

(12) United States Patent
Douglas

(10) Patent No.: US 12,449,273 B2
(45) Date of Patent: Oct. 21, 2025

(54) LOCAL VECTOR MAP

(71) Applicant: ARGO AI, LLC, Pittsburgh, PA (US)

(72) Inventor: Timothy James Douglas, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 210 days.

(21) Appl. No.: 18/072,117

(22) Filed: Nov. 30, 2022

(65) Prior Publication Data
US 2024/0175708 A1    May 30, 2024

(51) Int. Cl.
*B60W 60/00*    (2020.01)
*G01C 21/00*    (2006.01)

(52) U.S. Cl.
CPC ....... *G01C 21/3837* (2020.08); *B60W 60/001* (2020.02); *B60W 60/0025* (2020.02); *B60W 2556/40* (2020.02)

(58) Field of Classification Search
CPC ............ G01C 21/3837; B60W 60/001; B60W 60/0025; B60W 2556/40
See application file for complete search history.

(56) References Cited

U.S. PATENT DOCUMENTS

| | | | |
|---|---|---|---|
| 6,047,280 A | 4/2000 | Ashby et al. | |
| 9,268,806 B1 | 2/2016 | Kesselman | |
| 2009/0024656 A1 | 1/2009 | Wellman | |
| 2016/0179841 A1 | 6/2016 | Ford | |
| 2017/0241791 A1 | 8/2017 | Madigan | |
| 2018/0188045 A1 | 7/2018 | Wheeler et al. | |
| 2018/0285052 A1* | 10/2018 | Eade | B65G 1/0492 |
| 2019/0064815 A1 | 2/2019 | Haynes | |
| 2019/0187877 A1 | 6/2019 | Scattolin et al. | |
| 2019/0278297 A1 | 9/2019 | Averhart et al. | |
| 2019/0378412 A1 | 12/2019 | Zhu | |
| 2020/0026720 A1 | 1/2020 | Liu et al. | |
| 2020/0072616 A1* | 3/2020 | Shi | G01C 21/30 |
| 2021/0004363 A1 | 1/2021 | Bailly et al. | |
| 2021/0180979 A1 | 6/2021 | Kitahara | |
| 2022/0011120 A1* | 1/2022 | St. Romain | G08G 1/096741 |
| 2022/0092092 A1 | 3/2022 | Cajias et al. | |
| 2023/0087702 A1 | 3/2023 | Carnahan et al. | |
| 2023/0117357 A1* | 4/2023 | Heitzmann | G01C 21/3811 382/103 |
| 2023/0127185 A1* | 4/2023 | Jeong | G01C 21/3819 701/25 |
| 2023/0289372 A1 | 9/2023 | Chen et al. | |
| 2024/0175710 A1 | 5/2024 | Douglas | |
| 2024/0175715 A1 | 5/2024 | Douglas | |
| 2024/0176774 A1 | 5/2024 | Douglas | |

* cited by examiner

*Primary Examiner* — Rodney A Butler
(74) *Attorney, Agent, or Firm* — Sterne, Kessler, Goldstein &Fox P.L.L.C.

(57) ABSTRACT

Disclosed herein are system, method, and computer program product aspects for enabling providing map updates to an autonomous vehicle (AV). The system can has four features that can (1) provide live map updates, (2) provide a mechanism to optimize map updates, (3) utilize AV sensors to provide local map updates and integrate into the broader map update system, and (4) provide a mechanism to provide low latency updates.

18 Claims, 9 Drawing Sheets

LOCAL VECTOR MAP

BACKGROUND

Autonomous vehicles (AVs) typically rely on digital maps of their surroundings to operate. These maps are typically generated in part using vehicles that drive on roads, and that use technology such as sensors, LIDAR, cameras, radar, GPS, etc. to capture and/or generate images of their surroundings. These captured images are then used to generate the maps. Once generated, the maps can be uploaded to servers that then push them an AV, or are directly downloaded to the computer system of the AV.

In general, the content of the downloaded maps is static. Once deployed to the AV, these maps are immutable until the AV downloads another version of the map. However, a problem arises when road conditions change in ways that need to be reflected on the map. However, such changes may not be reflected on the map because they may be so small that they would not justify the costs (bandwidth, processing, availability, etc.) of generating another full version of the map to push to the AV, yet may be significant enough to impact driving conditions on the road. For example, installation of a single stop sign in a large geographic area may not be a sufficiently large change to justify generating another map to push to an AV, yet on its own is significant enough that if an AV does not recognize that a stop sign is installed, it could result in potentially dangerous road conditions. Thus, systems and methods are needed to incrementally update the AV maps to reflect any changes to road conditions of a particular geographic area that the AV may encounter when operating.

SUMMARY

Aspects of this disclosure are directed to a system, methods, and architecture that can be used to update a base map of an AV. In aspects, the system can be implemented such that the computing devices and software implementing the system reside on the AV. In aspects, the base maps can be generated and downloaded onto the AV. In aspects, the system can implement methods to establish, a connection to a cloud computing service. The cloud computing service can be configured to store a version of the base map and also to provide map updates to the base map of the AV. In aspects, based on establishing the connection to the cloud computing service, the AV can identify itself to the cloud computing service. In aspects, this can be done by transmitting a vehicle identification number (VIN). The VIN can identify the AV to the cloud computing service. In this way, the cloud computing service can determine what specific AV is to have updates pushed to its base map. In aspects, the VIN can be associated with or linked to a particular geographic region/area. The particular geographic area/region will be referred to herein as a "map zone." For example, the VIN can identify the AV as being based in/located in a particular city, region, country, etc.

The map zone can also have various attributes. These attributes can be represented as data, metadata, objects, variables, etc., and integrated into the base map and/or data files used to update the base map. Knowing which geographic area/region is associated with the AV is useful because the cloud computing service can use the information to transmit relevant portions of the base map to the AV, and push any updates related to that particular map zone to the AV. In this way, resources are not wasted in transmitting all updates for the base map and can be focused on a particular geographic area. This results in quicker and more targeted updates, and overall efficiency of the system.

In aspects, based on transmitting the VIN to the cloud computing service and having the cloud computing service identify the AV, the AV can receive, from the cloud computing service, a map update document for a map zone linked to the VIN. In aspects, this can occur whenever updates for the map zone become available. In aspects, the map update document can be transmitted as soon as an update is available, or can be based on a minimum time interval. The minimum time interval can determine the rate at which the map update document is pushed to the AV from the cloud computing service.

The map update document refers to a computer implemented file that contains attributes of the map zone. The map update document can contain information related to the map zone and can contain any updates for the map zone. In aspects, the map update document can be implemented as a JavaScript Object Notation (JSON) file, a Protocols Buffer document, or a similar file. In aspects, the attributes of the map zone can include at least: a map zone identifier, a map zone type, coordinates defining the map zone on the base map, and data specific to the map zone. The map zone identifier refers to an alpha-numeric value that can be used to identify the map zone. The map zone type refers to what type of geographic area the map zone is. For example, this can be a neighborhood, city, county, region, state, etc. The coordinates defining the map zone can be, for example, GPS coordinates. The data specific to the map zone refers to data about the road, signage, traffic, environmental, restriction, etc. Thus, the attributes refer to data identifying the map zone and data indicating information regarding the map zone, such as road conditions, environmental conditions, traffic conditions, signage within the map zone, lane restrictions, areas to avoid within the map zone, etc.

In aspects, based on receiving the map update document, the AV can translate the map update document to a format that can be read and processed by the computing system and modules of the AV. For example, the AV can parse the map update document and generate a data structure with the attributes contained in the map update document. The data structure can be formatted in a manner in which the computing system and modules of the AV can understand and process. In aspects, this translation can include converting between coordinate systems so that the map zone can be properly identified on the base map. For example, GPS coordinates can be translated to map coordinates, etc.

In aspects, once the translation is complete and the data structure is generated, the resulting data structure can be applied to the base map to generate an updated map. The updated map refers to a version of the base map with updated information regarding the map zone being overlaid on top of the base map. Applying the data structure to generate the updated map can be done by, for example, finding differences between attributes of the base map and attributes contained in the data structure, and when a difference is found for the same attribute, replacing the attribute of the base map with attributes contained in the data structure. In aspects, this replacement is not be a wholesale replacement of the base map, but rather an overlay on top of the base map. In this way, the underlying base map itself is not changed, and only differences are added on top of the base map.

In aspects, once the updated map is generated, it can be transmitted to downstream modules of the AV to utilize the updated map to operate the AV. These downstream modules refer to software and/or hardware components that utilize the updated map to operate the AV. Examples of such modules are route planning modules, vehicle guidance systems, trajectory prediction modules, etc. In aspects, the transmitting to the downstream modules can be done based on a subscription model in which the downstream modules subscribe to map client libraries that are configured to push the updated map to the downstream modules when the updated map is generated. The map client libraries refer to a software and/or hardware component of the system that coordinates the pushing of the updated map to the downstream modules. In aspects, each downstream module can have its own map client task to coordinate the sending of the updated map to the module. Thus, if any particular downstream module needs to have updates provided based on a custom schedule or format, its associated map client task can be configured to implement this custom schedule or format.

In aspects, transmitting the updated map to the downstream modules can be done in real-time after the updated map is generated. In aspects, transmitting the updated map to the downstream modules can be based on a scheduled time interval. The benefits of transmitting the updated map in real-time is that the AV can know of any updates to the road conditions of the map zone near instantly from when they are detected or become available to the AV. The benefits of transmitting the updated map based on a scheduled time interval is that the updates can be provided in a predictable and measured manner so as to not overload the system with constant updates. Depending on the priority that the update needs to be reflected to the base map of the AV, each map client task can implement the specific manner in which to transmit the updated map.

In aspects, the system can be optimized when updating map updates on the AV. In aspects, this optimization stems from how the base map is structured. The optimization can be performed as a series of steps. Attributes of a map zone can be stored in a contiguous region of a memory. Updates to the attributes can be stored in a parallel contiguous region of memory. The memory location of the attributes and the updates to the attributes can be linked. A request can be received for an attribute of the attributes. A determination can be made as to which of the attribute or an update to the attribute to return. Based on the request, either of the attribute or the update to the attribute can be returned.

In aspects, the system can also use the AVs on board sensors to generate map updates. For example, sensors such as cameras, radar/sonar, LIDAR, etc. can also be used to capture images or generate a local image of the AVs surroundings. Based on the same, the AV can generate map updates that can be integrated and/or consolidated into the map updates pushed to the AV by the cloud computing service. In this way, real-time information about the AVs surroundings can also be accounted for when generating map updates. Additionally, and as a result, the AV can become part of the system that generates map updates. Thus, the AVs themselves can become integral components/tools in providing map updates.

In aspects, the AV can generate map updates by first receiving data indicating road conditions of a map zone via sensors of the AV. In aspects, the AV can generate a local map update document for the map zone based on the data. The local map update document can be similar to the map update document previously discussed. In aspects, the AV can also receive a map update document for the map zone, where the map update document contains attributes of the map zone. The map update document refers to the same map update document previously mentioned and sent by the cloud computing service to the AV. In aspects, a determination can be made whether conflicts exist between the data in the local map update document and the attributes in the map update document. A conflict refers to a discrepancy between the local map update document and the map update document. For example, one document can indicate a stop sign while the other document does not for the exact same location, a different speed limit, road closures, etc., which would be considered a discrepancies. A person of skill in the art would recognize based on the aforementioned example what further discrepancies would be.

In aspects, when a conflict is found, a determination can be made as to which of the data or the attributes is more restrictive. For example, a more restrictive data or attribute can be one indicating an added signage, a road closure, etc. In this way, the data or attributes that indicate an added obstacle or restricted movement and/or add restrictive conditions to vehicle and/or a pedestrian movement within the map zone are considered. In aspects, in order to consolidate/integrate the two map documents into a map update, the more restrictive of the data or attribute can be applied to a base map of the AV in order to generate an updated map. In aspects, once the updated map is generated, it can be transmitted to downstream modules of the AV to utilize the updated map to operate the AV.

In aspects, in the instance where no conflict is found, both the data in the local map update document and the attributes in the map update document can be applied to the base map to generate the updated map. In this way, all the data and attributes from both documents can be integrated into the updated map. In aspects, the local map update document can be implemented in the same file format as the map update document. For example, the local map update document can be generated in a format using a Cereal binary serialization library. A person of ordinary skill in the art is familiar with Cereal and the details of such a library will not be discussed in detail herein. In aspects, the transmission of the updated map to the downstream modules can be done based on the same subscription model previously discussed, where the downstream modules subscribe to map client libraries that are configured to push the updated map to the downstream modules when the updated map is generated. In aspects, transmitting the updated map to the downstream modules can be done in real-time after the updated map is generated. In aspects, transmitting the updated map to the downstream modules can be done based on a scheduled time interval. In aspects, updating the local map update document can be done in real-time while the AV is operating.

In aspects, the number of map updates pushed to an AV can be frequent. Frequent updates, however, can introduce latency as a result of the AV having to process all of the frequent updates. Thus, mechanisms are needed to throttle the map update mechanism to prioritize the urgent updates from those that do not need to be pushed to the AV as urgently. In aspects, the system can provide such a throttling mechanism. This can be done by categorizing each of the map updates received based on, for example the source from which they are received, and prioritizing which ones are to be pushed to the base map first.

In aspects, the system can perform the prioritization by first receiving map update data from various sources. For example, the sources can include: a map update document for a map zone from a cloud computing service, where the map update document contains attributes of the map zone; a local map update document for the map zone, where the local map update document includes data obtained via sensors of the AV and indicates road conditions of the map zone; and user input data related to the map zone. In aspects, the system can then categorize each of the map update document, the local map update document, and the user input data based on prioritization levels. In aspects, the system can then update a base map with information from each of the map update document, the local map update document, and the user input data based on the prioritization levels to obtain an updated map. In aspects, the prioritization levels can include categorizations such as: a high priority, an intermediate priority, and a low priority. A high priority update refers to updates that need to be applied to the base map in real-time from when they are available. An intermediate priority refers to updates that need to be applied to the base map but do not need to be in real-time and can have a delay prior to applying them to the base map. A low priority update refers to updates that need to be applied to the base map but can be delayed when they are applied to the base map for a time period longer than the intermediate priority updates.

In aspects, each of the prioritization levels can have an associated time delay after which updates from each of the map update document, the local map update document, and the user input data are applied to update the base map. For example, the low priority updates can be applied after five seconds of their availability. Intermediate priority updates can be applied after 1 second of their availability. High priority updates can be applied in less than 1 second of their availability. In aspects, the system can also monitor the frequency at which the map updates are being received from the various sources and generate alerts if the frequency is above a predetermined threshold. As a result, the timing of the updates can also be adjusted if it is determined that the updates are being received too frequently so as to not overwhelm the computing system of the AV. In this way, the system can have a throttling mechanism to make sure that map updates are applied and as little latency is introduced as possible. This provides for an overall more efficient map updating mechanism.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, apparatus, device, method and/or computer program product aspects, and/or combinations and sub-combinations thereof, to update a base map of an AV. The system provides a unique architecture that can be used to update the base map of the AV. A benefit of the system over conventional approaches is in simplifying how map related data is distributed to AVs and their modules. In an aspect, the system provides a pipeline to deliver map updates through a single source, which can then be distributed to the various modules of the AV. Moreover, these updates can be provided incrementally, as well as on a scheduled time or in real-time. In this way, changed road conditions can be reflected on a base map of the AV.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an AV. However, the present solution is not limited to AV applications. The present solution may be used in other applications such as robotic applications, radar system applications, metric applications, and/or system performance applications.

Figure 1:
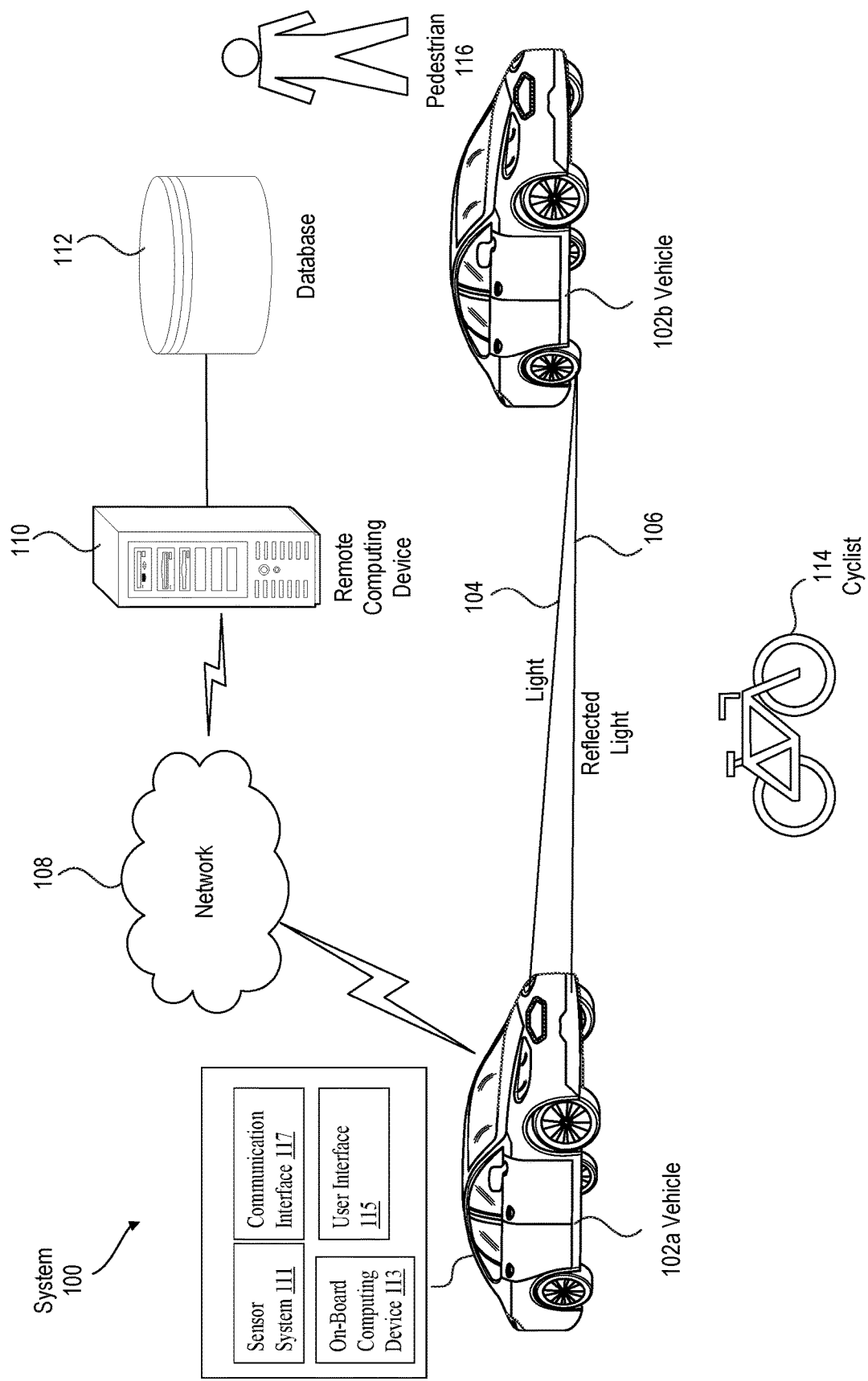
FIG. 1 illustrates an exemplary autonomous vehicle (AV) system, in accordance with aspects of the disclosure.

FIG. 1 illustrates an exemplary AV system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, or 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
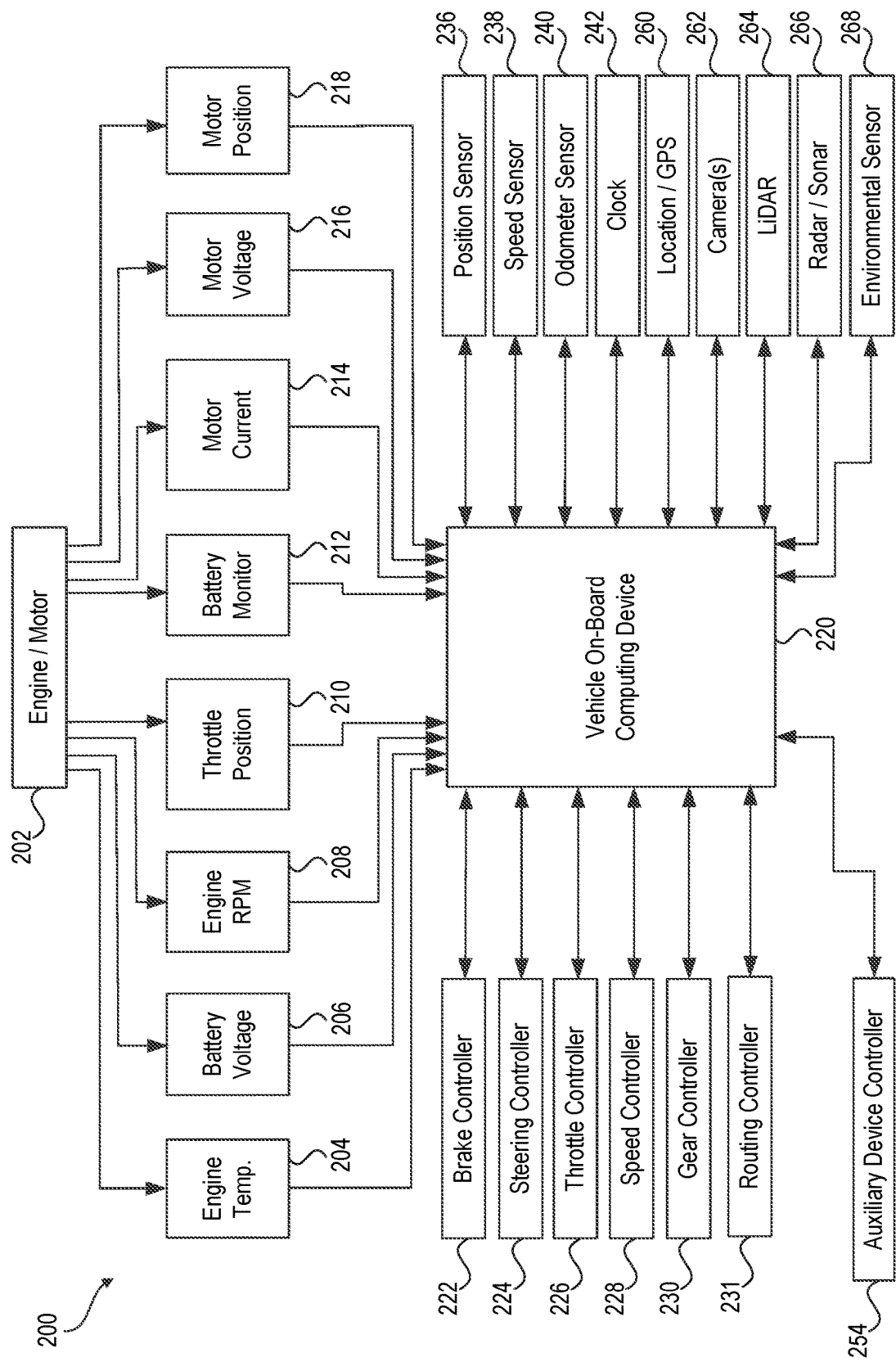
FIG. 2 illustrates an exemplary architecture for an AV, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

AV 102a may be configured with a LIDAR system, e.g., LIDAR system 264 of FIG. 2. The LIDAR system may be configured to transmit a light pulse 104 to detect objects located within a distance or range of distances of AV 102a. Light pulse 104 may be incident on one or more objects (e.g., AV 102b) and be reflected back to the LIDAR system. Reflected light pulse 106 incident on the LIDAR system may be processed to determine a distance of that object to AV 102a. The reflected light pulse may be detected using, in some aspects, a photodetector or array of photodetectors positioned and configured to receive the light reflected back into the LIDAR system. LIDAR information, such as detected object data, is communicated from the LIDAR system to an on-board computing device, e.g., on-board computing device 220 of FIG. 2. The AV 102a may also communicate LIDAR data to a remote computing device 110 (e.g., a cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the LIDAR systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a and 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and motor voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System (GPS) device); object detection sensors such as one or more cameras 262; a LIDAR system 264; and/or a radar and/or a sonar system 266. The sensors also may include environmental sensors 268 such as a precipitation sensor and/or ambient temperature sensor. The object detection sensors may enable the vehicle to detect objects that are within a given distance range of AV 102a or 102b of FIG. 1, in any direction, while the environmental sensors collect data about environmental conditions within the vehicle's area of travel.

During operations, information is communicated from the sensors to a vehicle on-board computing device 220 (the same as on-board computing device 113 of FIG. 1). The on-board computing device 220 may be implemented using the computer system of FIG. 7. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LIDAR system 264 is communicated from those sensors) to the on-board computing device 220. The object detection information and/or captured images are processed by the on-board computing device 220 to detect objects in proximity to the AV 102a or 102b. Any known or to be known technique for making an object detection based on sensor data and/or captured images may be used in the aspects disclosed in this document.

LIDAR information is communicated from LIDAR system 264 to the on-board computing device 220. Additionally, captured images are communicated from the camera(s) 262 to the vehicle on-board computing device 220. The LIDAR information and/or captured images are processed by the vehicle on-board computing device 220 to detect objects in proximity to the AV 102a or 102b. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an AV 102a. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost functions during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., LIDAR or RADAR data, camera images, etc.) in order to identify objects and/or features in the environment of AV 102a. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various aspects, the on-board computing device 220 may determine a motion plan for the AV 102a. For example, the on-board computing device 220 may determine a motion plan for the AV 102a based on the perception data and/or the prediction data. Specifically, given predictions about the future locations of proximate objects and other perception data, the on-board computing device 220 can determine a motion plan for the AV 102a that best navigates the AV 102a relative to the objects at their future locations.

In some aspects, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the AV 102a, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision may be avoided if the AV 102a follows a defined vehicle trajectory and/or implements one or more dynamically generated emergency maneuvers performed in a pre-defined time period (e.g., N milliseconds). If the collision may be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the AV 102a is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Vector Map Live Updates

Figure 3:
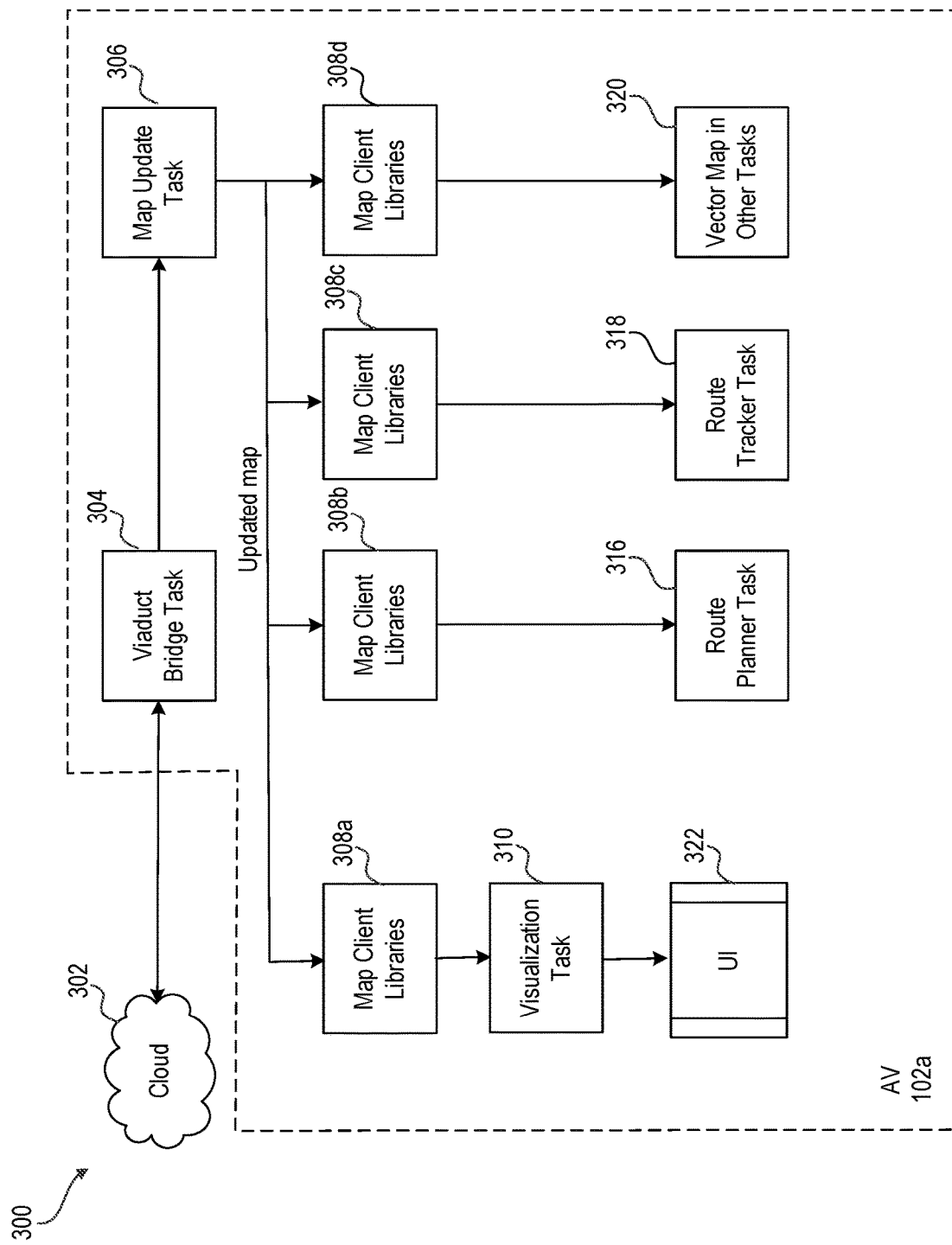
FIG. 3 is an example control flow of a system for updating a base map of the AV, in accordance with aspects of the disclosure.

FIG. 3 is an example control flow of a system 300 for updating a base map of an AV (e.g., AV 102a), in accordance with aspects of the disclosure. The base map refers to a pre-generated map that is downloaded onto the AV and is used to help the AV navigate its surroundings. In aspects, the system 300 can be implemented such that it resides wholly on the AV. In other aspects, portions of the system 300 can be implemented such that they reside on remote devices and/or servers. For example, a bridge task 304 can be implemented to serve as an interface between the AV and a cloud computing service 302. In aspects, the bridge task 304 can be a software module configured to send and receive information between the AV and the cloud computing service 302. In aspects, the bridge task 304 can receive map updates from the cloud computing service 302. In aspects, part of the functionality of the bridge task 304 can be implemented on the cloud computing service 302 and part on the AV based on a client-service architecture.

In aspects, the control flow can begin by establishing a connection between the AV and the cloud computing service 302. The cloud computing service 302 can be a service/software component or module of a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud but is operated for a single organization.

In aspects, the cloud computing service 302 can be configured to store a version of the base map that can be pushed to AVs. The cloud computing service 302 can also be configured to store information about updates that need to me made to the base map. In aspects, based on (or as a part of) establishing the connection to the cloud computing service 302, the AV can identify itself to the cloud computing service 302. In aspects, this can be done by transmitting a vehicle identification number (VIN) of the AV to the cloud computing service 302. The VIN can identify the AV to the cloud computing service 302. In this way, the cloud computing service 302 can determine what specific AV is to have updates pushed to its base map. In aspects, the VIN can be associated with or linked to a particular geographic region/area. For example, the cloud computing service 302 can compare the VIN to known VINs of AVs to determine the particular geographic region/area that the VIN is registered or associated with. The particular geographic area/region will be referred to herein as a "map zone." For example, the VIN can identify the AV as being based in/located in a particular neighborhood, city, region, state, country, etc.

In aspects, the map zone can be represented on the base map and identified using map coordinates. Moreover, the map zone can have various attributes that can also be represented within the base map. These attributes can be represented as data, metadata, objects, variables, etc. within the data structure of the base map, and can be integrated into the base map and/or data files used to update the base map. Knowing which geographic area/region is associated with the AV is useful because the cloud computing service 302 can use the information to transmit relevant portions of the base map to the AV, and transmit any updates related to that particular map zone to the AV. In this way, resources are not wasted in transmitting all updates for the base map to the AV. The updates can also be sent based on tracking the AV as it traverses various geographic areas. For example, if the AV moves towards an area outside of the map zone, updates can be pushed to the base map for that area so that the AV can have the most up to date information about the area. This results in quicker and more targeted updates, and overall efficiency of the system.

In aspects, based on transmitting the VIN to the cloud computing service 302 and having the cloud computing service 302 identify the AV, the AV can receive, from the cloud computing service 302, a map update document for a map zone linked to the VIN. In aspects, this can occur whenever updates for the map zone become available. In aspects, the map update document can be transmitted as soon as an update is available, or can be based on a minimum time interval. The minimum time interval can determine the rate at which the map update document is pushed to the AV from the cloud computing service 302. For example, the minimum time interval can indicate that updates cannot be pushed to the AV until at least 5 seconds, 10 seconds, 1 minute, etc. has passed since the last update. In this way, the updates can be throttled so as to not overwhelm the AV.

The map update document refers to a computer implemented file that contains attributes of the map zone. The map update document can contain information related to the map zone and can contain any updates for the map zone. In aspects, the map update document can be implemented as a JavaScript Object Notation (JSON) file, a Protocols Buffer document, Extensible Markup Language (XML) file, or a similar file. In aspects, the attributes of the map zone can include at least: a map zone identifier, a map zone type, coordinates defining the map zone on the base map, and data specific to the map zone. The map zone identifier refers to an alpha-numeric value that can be used to identify the map zone. The map zone type refers to what type of geographic area the map zone is. For example, this can be a neighborhood, city, county, region, state, etc. The coordinates defining the map zone can be, for example, GPS coordinates or custom designed map coordinates. The data specific to the map zone refers to data about the road, signage, traffic, environmental, restrictions (areas to keep out of—Keep Out Zones (KOZ)) within the map zone, etc. Thus, the attributes refer to data identifying the map zone and data indicating information regarding the map zone, such as road conditions, environmental conditions, traffic conditions, signage within the map zone, lane restrictions, areas to avoid within the map zone, etc.

In aspects, the map update document can be received by a map update task 306 of the AV. The map update task 306 refers to a software module of the AV that can process the map update document and apply the updates to the base map to obtain an updated map for the AV. In aspects, based on receiving the map update document, the map update task 306 can translate the map update document to a format that can be read and processed by the computing system and modules of the AV. For example, the map update task 306 can parse the map update document and generate a data structure with the attributes contained in the map update document. The data structure can be formatted in a manner in which the computing system and modules of the AV can understand and process. In aspects, this translation can include, for example, converting between coordinate systems so that the map zone can be properly identified on the base map. For example, GPS coordinates that are used to represent the map zone in the map update document can be translated to map coordinates so that the map zone can be identified on the base map.

In aspects, once the translation is complete and the data structure is generated, the resulting data structure can be applied to the base map to generate an updated map. The updated map refers to a version of the base map with updated information regarding the map zone being overlaid on top of the base map. Applying the data structure to generate the updated map can be done by, for example, finding differences between attributes of the base map and attributes contained in the data structure, and when a difference is found for the same attribute, replacing the attribute of the base map with attributes contained in the data structure. By way of example, if the base map shows that there is no stop sign at an intersection, and the data structure shows that the same intersection now has a stop sign, the base map can be updated so that stop sign information is overlaid onto the base map. This is merely an example and a person skilled in the art will recognize that other attributes can be updated in this manner. For example, information related to new roads, traffic conditions, roads that are no longer accessible, etc. In aspects, this replacement would not be a wholesale replacement of the base map, but rather an overlay on top of the base map as previously indicated. In this way, the underlying base map itself is not changed, and only differences are added on top of the base map. This also adds to the efficiency of the system because only incremental changes will be pushed to the base map, increasing the speed at which the base map is updated and lessening the data that needs to be processed to reflect changes rather than a wholesale replacement of the base map.

In aspects, once the updated map is generated it can be transmitted to downstream modules of the AV to utilize the updated map to operate the AV. These downstream modules refer to software and/or hardware components of the AV that utilize the updated map to operate the AV. Examples of such modules can include a visualization task 310, a route planner task 316, a route tracker task 318, and other tasks 320 (e.g., vehicle guidance systems, trajectory prediction modules, etc.). For example, the visualization task 310 can be a module or set of modules that can be used the update map generate graphics to be displayed on a user interface (UI) 322 of the AV to display the updated map. The route planner task 316 can be a module or set of modules that can use the updated map to generate routes for the AV based on destination inputs. The route tracker task 318 can be a module or set of modules that can use the updated map to track the routes of the AV and work in conjunction with the route planner task 316 to modify any routes being traversed/travelled by the AV. The other tasks 320 refer to various other tasks that a person of skill in the art would recognize that need map functionality.

In aspects, the transmitting to the downstream modules can be done based on a subscription model in which the downstream modules subscribe to map client libraries 308 that are configured to push the updated map to the downstream modules when the updated map is generated. The map client libraries 308 refer to a software and/or hardware component of the system 300 that coordinates the pushing of the updated map to the downstream modules. This can be done via application programming interfaces (APIs) that can be implemented on the map client libraries 308 and interfaced with by the downstream modules to receive the updated map. In aspects, each downstream module can have its own map client task. In FIG. 3, the various map client libraries are shown as {308a, 308b, 308c, 308d}. Based on the number of downstream modules, this number can be variable. Thus, if any particular downstream module needs to have updates provided based on a custom schedule or format, its associated map client task can be configured to implement this custom schedule or format.

In aspects, transmitting the updated map to the downstream modules can be done in real-time after the updated map is generated. Real-time refers to transmitting the updated map within seconds or milliseconds of when the updated map is generated. In aspects, transmitting the updated map to the downstream modules can be based on a scheduled time interval. For example, the scheduled time interval can indicate that the updates are received every 'X' seconds or minutes, where 'X' is a real number. The benefits of transmitting the updated map in real-time is that the AV can know of any updates to the road conditions of the map zone near instantly from when they are detected or become available to the AV. The benefits of transmitting the updated map based on a scheduled time interval is that the updates can be provided in a predictable and measured manner so as to not overload the AV with constant updates. Depending on the priority that the update needs to be reflected to the base map of the AV, each map client task can implement the specific manner in which to transmit the updated map.

Figure 4:
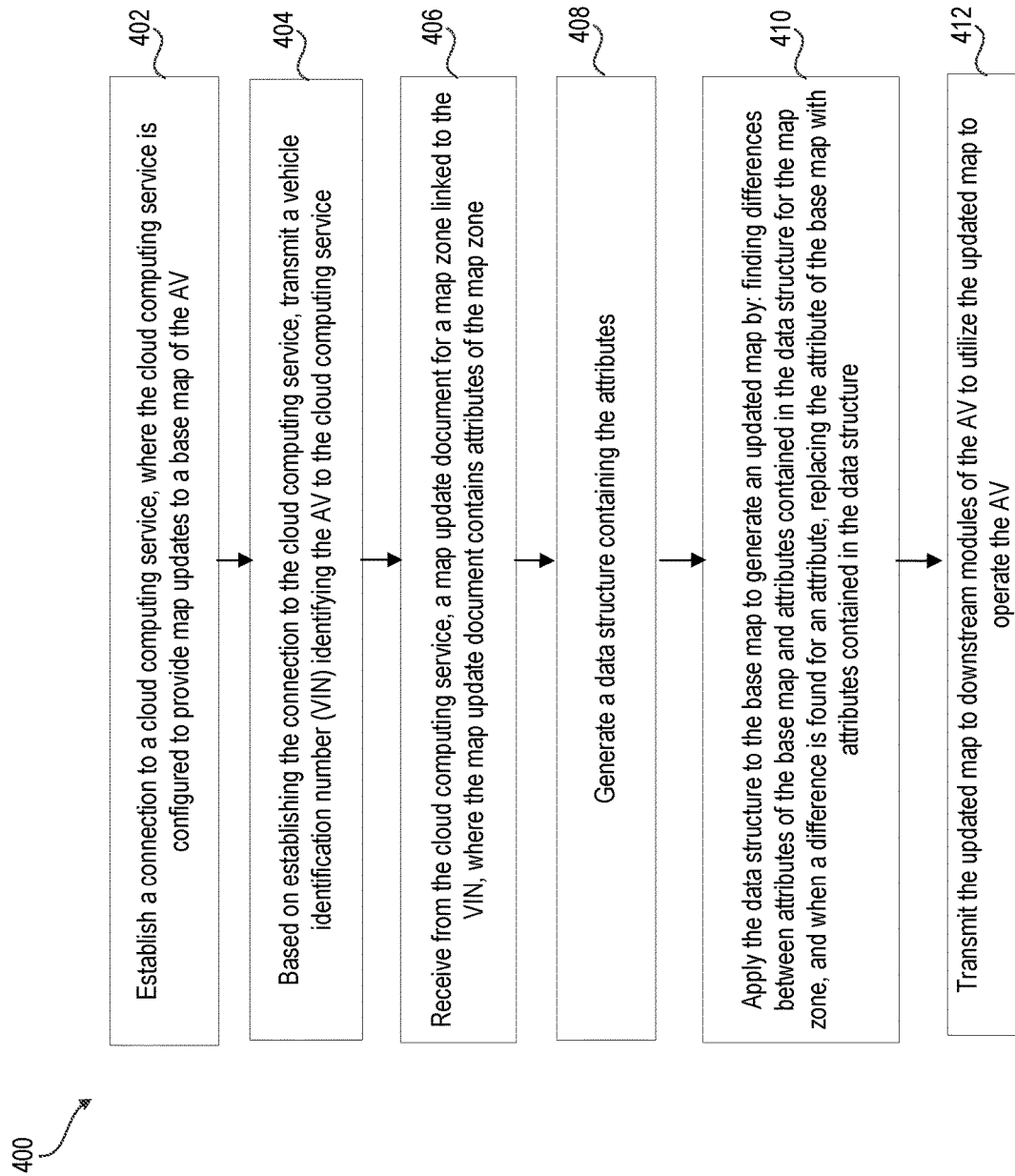
FIG. 4 is an example method of operating the system for updating the base map of the AV, in accordance with aspects of the disclosure.

FIG. 4 is an example method 400 of operating the system 300 for updating the base map of the AV (e.g., AV 102a), in accordance with aspects of the disclosure. Method 400 may be performed by the components and modules of system 300. For example, the on-board computing device 113 and/or 220 can store instructions on a non-transitory computer readable medium, and have one or more processors to execute the stored instructions to implement method 400. Moreover, the various components described in FIG. 2 can be used in conjunction with and/or to support implementation of method 400. Method 400 can comprise a series of steps. As shown in FIG. 4, and at step 402, in aspects, one or more computing devices of the AV can establish a connection to a cloud computing service 302, where the cloud computing service 302 is configured to provide map updates to a base map of the AV. As shown in step 404, based on establishing the connection to the cloud computing service 302, transmit a vehicle identification number (VIN) identifying the AV to the cloud computing service 302. As shown in 406, the AV can receive from the cloud computing service 302, a map update document for a map zone linked to the VIN, where the map update document contains attributes of the map zone. As shown in 408, a data structure can be generated containing the attributes. As shown in 410, the data structure can be applied to the base map to generate an updated map. The data structure can be applied by: finding differences between attributes of the base map and attributes contained in the data structure for the map zone, and when a difference is found for an attribute, replacing the attribute of the base map with attributes contained in the data structure. As shown in 412, once generated, the updated map can be transmitted to downstream modules (e.g., 310, 316, 318, 320) of the AV to utilize the updated map to operate the AV.

The modules and services described with respect to FIGS. 3 and 4 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units/components, such as a volatile memory, a nonvolatile memory, an internal memory, an external memory, or a combination thereof. The non-transitory computer readable medium may be integrated as a part of the system 300 or installed as a removable portion of the system 300.

It has been discovered that the system 300 described above significantly improves the state of the art from conventional systems in that it provides a unique architecture that can be used to update the base map of the AV. The benefit of the system over conventional systems is that it simplifies how map related data is distributed to AVs and their modules. It provides a pipeline to deliver map updates through a single source, which can then be distributed to the modules of the AV. Moreover, these updates are provided incrementally and can be provided to the map based on a scheduled time or in real-time. In this way, changed road conditions can be reflected on a base map of the AV. The incremental nature of the updates allows the AV to conserve bandwidth in communicating updates because smaller updates can be received over a period of time, therefore not overwhelming the AV with updates. Moreover, these incremental updates allow for quicker deployment of map updates. This is critical in situations where the updates are small but important. For example, if a stop sign is installed at an intersection this change, while it may not be large enough to justify creating a new map, can be pushed to the base map quickly to avoid a situation where the AV misses the stop sign because it is not reflected in the base map, and potentially causing a fatal accident.

Vector Map Optimization

Figure 5:
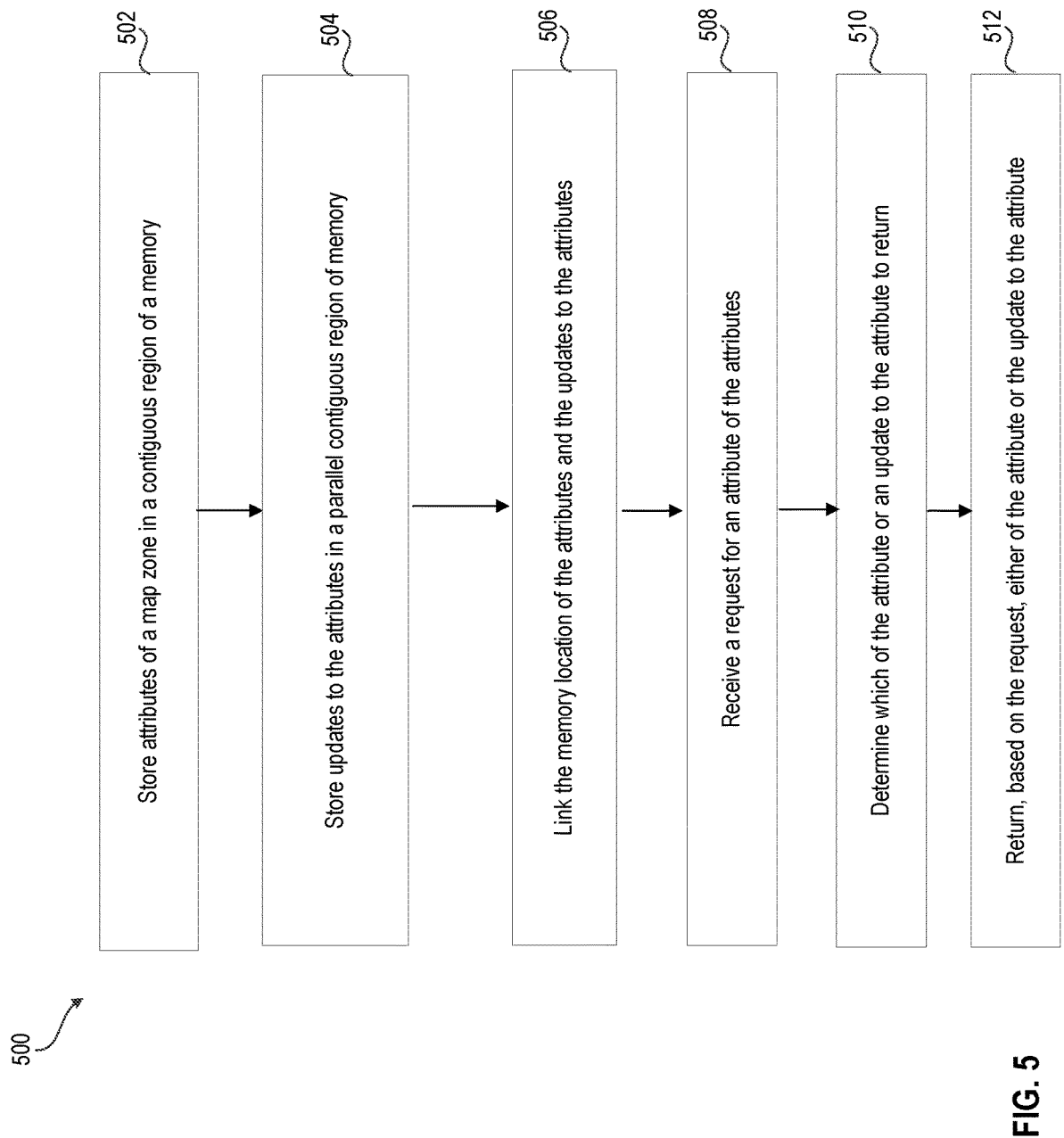
FIG. 5 is an example method of operating the system to optimize updating the base map of the AV, in accordance with aspects of the disclosure.

FIG. 5 is an example method 500 of operating the system to optimize updating the base map of the AV (e.g., AV 102*a*), in accordance with aspects of the disclosure. In aspects, this optimization stems from how the base map and the updates are structured.

Conventional approaches to updating maps have taken an object oriented programming approach. In the object oriented approach, attributes of a map zone are represented by objects and these objects point to one another to create relationships indicating what objects are related to what other objects. For example, continuous road segments can each have objects representing each segment (e.g., object A representing segment 1, object B representing segment 2, etc.). In order to represent the relationships between these segments, conventionally pointers are used to reference one segment from the other. Thus, for example, if object A is a predecessor road segment to object B, a pointer can indicate a relationship between the two by having Object B point to Object A as a predecessor, and Object A can have a pointer indicating Object B is its successor road segment.

In method 500, the pointer approach is replaced with array/index approach. The array/index approach, rather than have objects representing the attributes and pointing to one another, has the attributes of the map zone stored in contiguous regions of a memory location. These are attributes of the base map. Each of the attributes will have its information stored in a memory location with its own unique index number and following objects stored in sequential order using the memory array index as a reference to the attribute. Thus, for the example of road segments, Object A will be stored in a memory location with an index prior to Object B.

In aspects, a separate memory location can be allocated for map updates to each of the attributes. This separate memory location can mirror the contiguous memory location. Thus, if map updates are provided for attributes, for example Object A, the updates can be stored in this separate memory location. In aspects, the indices of the attribute and the update for the attribute can be linked together. This linking can allow the system to track, compare, and return the attribute and/or any updates for the attributes. In aspects, if the system calls for information about an attribute, for example Object A, the system can look up Object A's indices. In aspects, if the system recognizes that there is an updated version of Object A due to the linked indices, it can return the updated version. In this way, updated versions of attributes can be returned without using pointers.

The aforementioned can be performed as a series of steps, shown in FIG. 5. At step 502, attributes of a map zone can be stored in a contiguous region of a memory. At step 504, updates to the attributes can be stored in a parallel contiguous region of memory. At step 506, the memory location of the attributes and the updates to the attributes can be linked. At step 508, a request can be received for an attribute of the attributes. At step 510, a determination can be made as to which of the attribute or an update to the attribute to return. At step 512, based on the request, either of the attribute or the update to the attribute can be returned.

It has been discovered that the aforementioned method 500 and architecture for storing and transmitting map data significantly improves conventional methods of storing and updating map data because it improves performance/speed of transmitting the map updates to the AV. Rather than using an object oriented approach to represent and link attributes of a map zone to one another, which requires a reconfiguration of pointers when attributes are updated, the array/index based approach of method 500 can quickly look up updates in memory indices and determine if a linked update to the attribute is present so that it can be returned in place of the attribute. This use of memory indices has been determined to significantly improve speed at which map updates can be accessed and returned. The use of conventional approaches with pointers would be too computationally expensive to perform because when each attribute object is updated the pointers to the updated object have to be reconfigured. Method 500 requires no reconfiguration of pointers. What is needed when updating objects is to know the linked indices for an attribute.

Method 500 may be performed by the components and modules of system 300. For example, the on-board computing device 113 and/or 220 can store instructions on a non-transitory computer readable medium, and have one or more processors to execute the stored instructions to implement method 500. Moreover, the various components described in FIG. 2 can be used in conjunction with and/or to support implementation of method 500. Method 500 can comprise a series of steps.

Local Vector Map

Figure 6:
FIG. 6 is an example method of operating the system for updating the base map by integrating data collected by sensors of the AV, in accordance with aspects of the disclosure.

FIG. 6 is an example method 600 of operating the system 300 for updating the base map by integrating data collected by sensors of the AV (e.g., AV 102a), in accordance with aspects of the disclosure. The sensors used can be those described with respect to FIG. 2. For example, sensors such as cameras, radar/sonar, LIDAR, etc. can be used to capture images or generate a local image of the AVs surroundings. Based on the same, the AV can generate map updates that can be integrated and/or consolidated into the map updates pushed to the AV by the cloud computing service 302. In this way, real-time information about the AVs surroundings can also be accounted for when generating map updates. Additionally, and as a result, the AV can become part of the system that generates map updates. Thus, the AVs themselves can become integral components/tools in providing map updates.

Method 600 may be performed by the components and modules of system 300. For example, the on-board computing device 113 and/or 220 can store instructions on a non-transitory computer readable medium, and have one or more processors to execute the stored instructions to implement method 600. Method 600 can comprise a series of steps.

In aspects, and as shown in step 602, the AV can generate map updates by first receiving data indicating road conditions of a map zone via sensors of the AV. In aspects, and as shown in step 604, the AV can generate a local map update document for the map zone based on the data collected. The local map update document can be similar to the map update document previously discussed except that the data it contains originates from the sensors of the AV. In aspects, and as shown in step 606, the AV can also receive a map update document for the map zone, where the map update document contains attributes of the map zone. The map update document refers to the same map update document previously mentioned and sent by the cloud computing service 302 to the AV. In aspects, and as shown in step 608, a determination can be made whether conflicts exist between the data in the local map update document and the attributes in the map update document. A conflict refers to a discrepancy between the local map update document and the map update document. For example, one document can indicate a road is mapped with a 35 mph speed limit, a map update might reduce that to 30 mph, but then a local map update could detect a speed limit sign saying 25 mph for the same road. In this case, 25 mph is the most restrictive so that is the speed limit used in the updated map. Another example is where one document indicates a road closure while the other does not for the exact same location. Both of these would be considered discrepancies. A person of skill in the art would recognize based on the aforementioned example what further discrepancies would be.

In aspects, and as shown in step 610, when a conflict is found, a determination can be made as to which of the data or the attributes is more restrictive. For example, a more restrictive data or attribute can be one indicating an added signage, a road closure, etc. as previously indicated. In this way, the data or attributes that indicate an added obstacle or restricted movement, and/or add restrictive conditions to vehicle and/or a pedestrian movement within the map zone are considered. In aspects, and as shown in step 612, in order to consolidate/integrate the two map documents into a map update, the more restrictive of the data or attribute can be applied to a base map of the AV in order to generate an updated map. This can be done by performing the same overlaying of data previously discussed where attributes or data are overlaid onto the base map to reflect updates to the map. In aspects, and as shown in step 614, once the updated map is generated, it can be transmitted to downstream modules of the AV to utilize the updated map to operate the AV.

In aspects, in the instance where no conflict is found, both the data in the local map update document and the attributes in the map update document can be applied to the base map to generate the updated map. In this way, all the data and attributes from both documents can be integrated into the updated map. In aspects, the local map update document can be implemented in the same file format as the map update document. For example, the local map update document can be a JSON file, a Protocol Buffers document, or an XML file. In aspects, the transmission of the updated map to the downstream modules can be done based on the same subscription model previously discussed, where the downstream modules subscribe to map client libraries 308 that are configured to push the updated map to the downstream modules when the updated map is generated. In aspects, transmitting the updated map to the downstream modules can be done in real-time after the updated map is generated. In aspects, transmitting the updated map to the downstream modules can be done based on a scheduled time interval. In aspects, updating the local map update document can be done in real-time while the AV is operating.

It has been discovered that the aforementioned method 600 significantly improves conventional systems because it also takes into account real-time data generated by the AV when generating map updates. In this way, the map updates can be obtained both via the cloud computing service 302 and from the AV itself. This approach provides the maximum amount of coverage for obtaining map updates because two sources of updates can be utilized to obtain map updates-one from the cloud computing service 302 and one from the AV itself. This way, there is a bi-directional and multi-source way of obtaining map updates. Additionally, and in further aspects the map updates obtained from the AV can themselves be pushed to the cloud computing service 302, which can itself push those updates to other AVs at a later time. In this way, each AV can contribute to generating map updates for the system 300.

Low Latency Vector Map Updates

Figure 7:
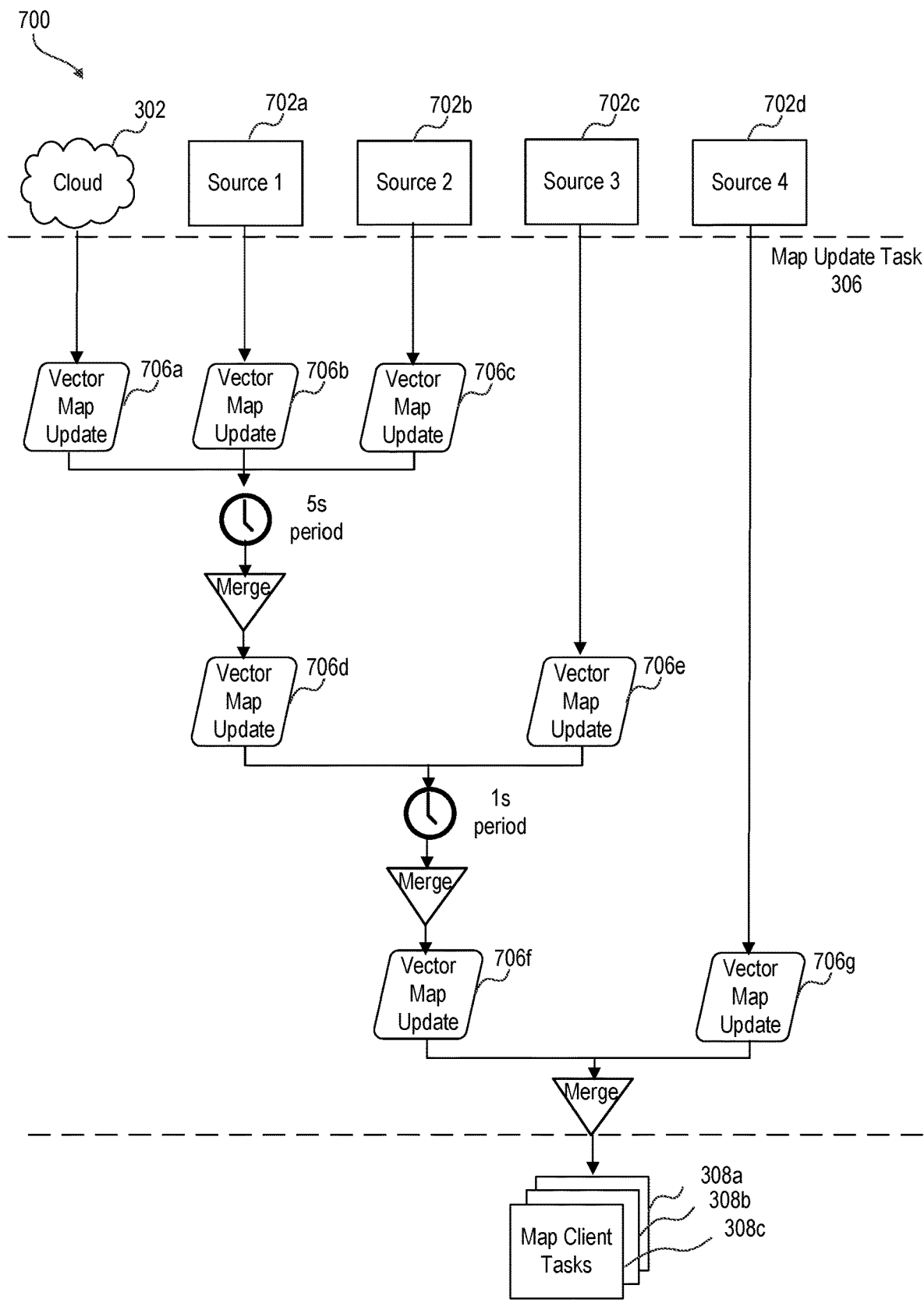
FIG. 7 is an example control flow for prioritizing updates of the base map, in accordance with aspects of the disclosure.

FIG. 7 is an example control flow 700 for prioritizing updates of the base map, in accordance with aspects of the disclosure. Prioritization is needed to lower latency when pushing map updates to the AV. This is because the number of map updates pushed to an AV can be frequent. Frequent updates, however, can introduce latency as a result of the AV having to process all of the frequent updates. Thus, mechanisms are needed to throttle the map update mechanism to prioritize the urgent updates from those that do not need to be pushed to the AV as urgently.

In aspects, the system can provide such a throttling mechanism via methods implementing control flow 700. Control flow 700 introduces a way to categorize each of the map updates received based on, for example the source from which they are received, and prioritize which ones are to be pushed to the base map first.

In aspects, the system can perform the prioritization by first receiving map update data from various sources. The various sources from which the map update data can be received is labeled as {702a, 702b, 702c, 702d} in FIG. 7. Also the cloud computing service 302 can also be a source. Thus, for example, the sources can include: a map update document for a map zone from a cloud computing service 302, where the map update document contains attributes of the map zone; a local map update document for the map zone, where the local map update document includes data obtained via sensors of the AV and indicates road conditions of the map zone; and user input data related to the map zone.

In aspects, the system 300 can then categorize each of the map update document, the local map update document, and the user input data based on prioritization levels. In aspects, the system can then update a base map with information from each of the map update document, the local map update document, and the user input data based on the prioritization levels to obtain an updated map. In aspects, the prioritization levels can include categorizations such as: a high priority, an intermediate priority, and a low priority. A high priority update refers to updates that need to be applied to the base map in real-time from when they are available. High priority updates can be, for example, those received from the sensors of a the AV and that are more restrictive than other updates obtained from other sources. For example, if sensors show a stop sign that the AV must immediately react to, this would be considered a high priority update that would need to be applied to the base map as soon as it is available. In aspects, these updates can be applied to the base map in less than one second from when they are available (which would be considered real-time). In FIG. 7, this can be seen by Source 4 (element 702d) pushing a map update (indicated as element 706g) immediately to the map client libraries 308.

An intermediate priority refers to updates that need to be applied to the base map but do not need to be in real-time, and can have a delay prior to applying them to the base map. This can be for example, updates related to use inputs about traffic conditions in the map zone. In aspects, these updates can be applied to the base map between five to one second from when they are available. In FIG. 7, this can be seen by Source 3 (element 702c) pushing a map update (indicated as element 706e) to the map client libraries 308 but with a one second delay.

A low priority update refers to updates that need to be applied to the base map but can be delayed when they are applied to the base map for a time period longer than the intermediate priority updates. Typically, this time period is five seconds or more from when these types of updates are available. In FIG. 7, this can be seen by cloud computing service 302, Source 1, and Source 2 pushing map updates (indicated as elements 706a, 706b, and 706c) to the map client libraries 308 but with a five second delay.

In aspects, these map updates can also be merged at each stage with one another in order to consolidate the map updates. For example, as shown in FIG. 7, each of the map updates can be merged with one another so as to stagger and consolidate the updates before they are pushed to the map client libraries 308.

In aspects, the system 300 can also monitor the frequency at which the map updates are being received from the various sources and generate alerts if the frequency is above a predetermined threshold. This monitoring mechanism provides an oversight mechanism to make sure that the computing systems of the AV do not get overwhelmed. In aspects, if it is determined that the updates are too frequent, the timing of the delays in applying and merging the updates can also be adjusted. For example, low priority updates can be adjusted to be applied less frequently and after longer delay periods. Similarly, intermediate updates can be adjusted to have them update less frequently. In this way, the system 300 can have a throttling mechanism to make sure that map updates are applied and as little latency is introduced as possible. This provides for an overall more efficient map updating mechanism. It has been discovered that performing throttling in this way significantly reduces the latency of providing map updates and allows higher priority updates to be applied to the base map first. Conventional systems typically process updates as they come, using the same timing mechanisms, and give the same prioritization to all updates regardless of their importance. Thus, less important updates can consume processing power of the AV while more consequential updates that are needed to be considered can be delayed.

Figure 8:
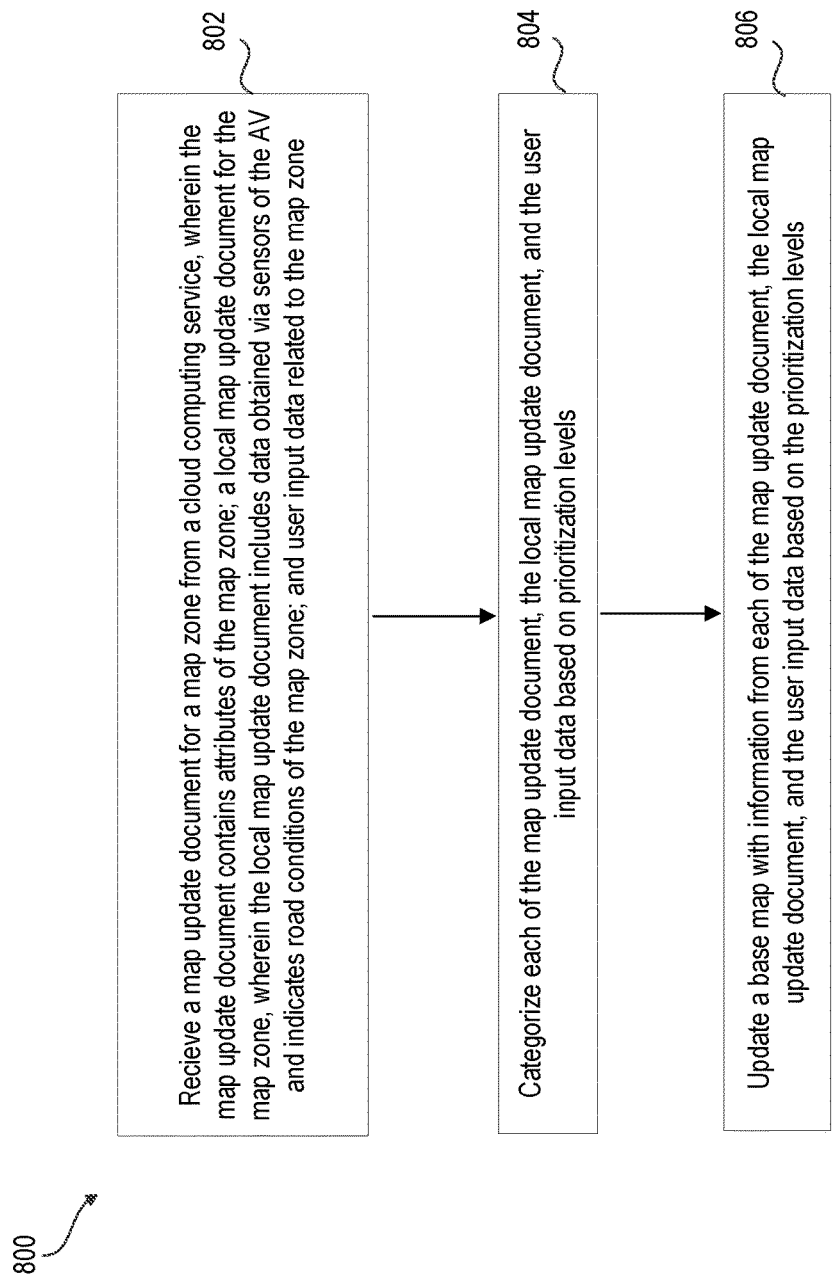
FIG. 8 is an example method of operating the system to prioritize updates of the base map, in accordance with aspects of the disclosure.

FIG. 8 is an example method 800 of operating the system to prioritize updates of the base map, in accordance with aspects of the disclosure. Method 800 shows the steps that can be performed in an aspect to implement control flow 700. In aspects, method 800 may be performed by the components and modules of system 300. For example, the on-board computing device 113 and/or 220 can store instructions on a non-transitory computer readable medium, and have one or more processors to execute the stored instructions to implement method 800. Method 800 can comprise a series of steps. As shown in 802, the steps can begin by the AV receiving a map update document for a map zone from a cloud computing service, where the map update document contains attributes of the map zone; a local map update document for the map zone, where the local map update document includes data obtained via sensors of the AV and indicates road conditions of the map zone; and user input data related to the map zone. As shown in step 804, each of the map update document, the local map update document, and the user input data can be categorized based on prioritization levels. As shown in step 806, a base map with information from each of the map update document, the local map update document, and the user input data can be updated based on the prioritization levels to obtain an updated map.

Components of the System

Figure 9:
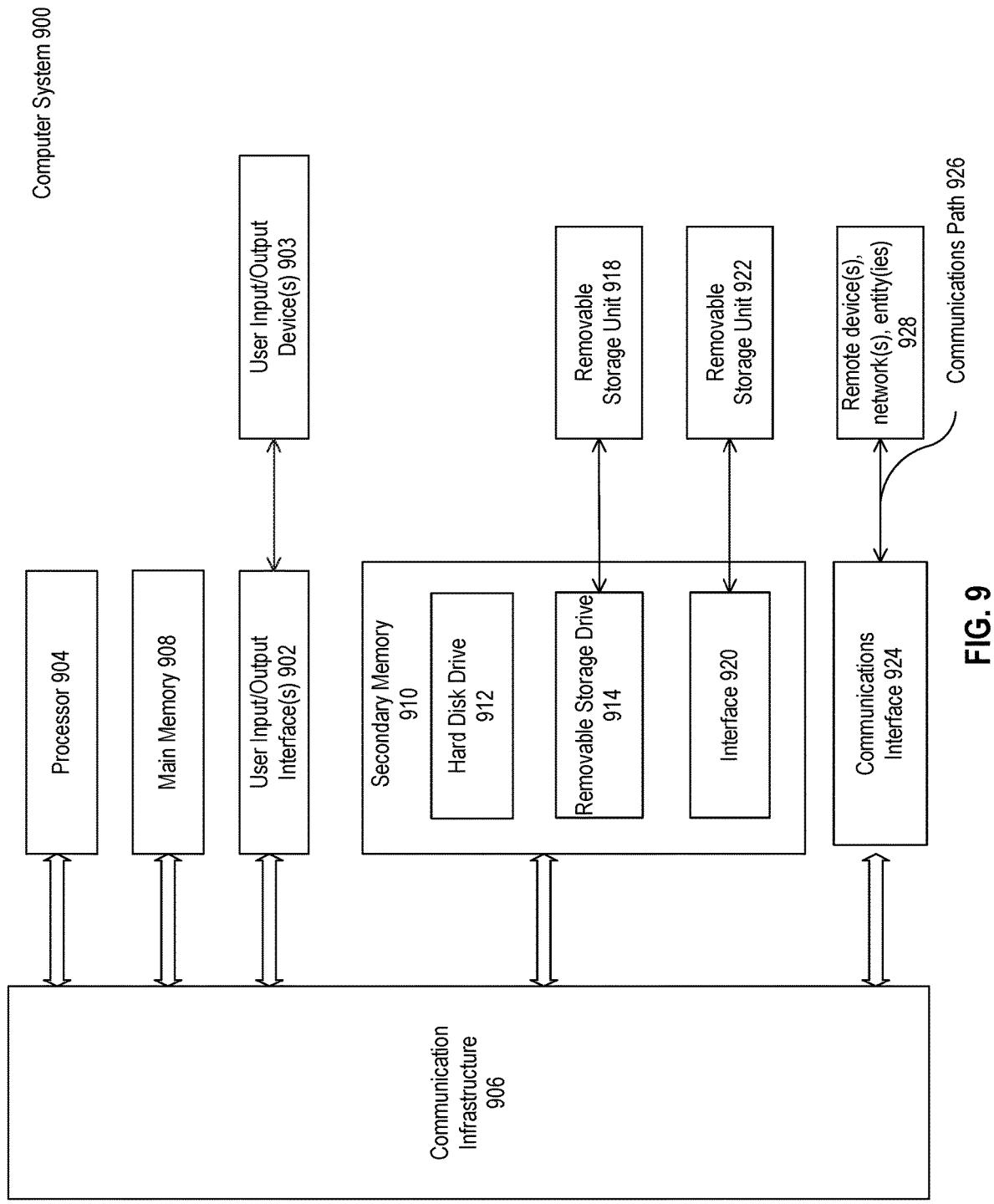
FIG. 9 is an example computing system useful for implementing various aspects, in accordance with aspects of the disclosure.

FIG. 9 is an example computer system 900 useful for implementing system 300, in accordance with aspects of the disclosure. Computer system 900 may be any computer capable of performing the functions described herein. The on-board computing device 220 of FIG. 2 may be implemented using components of the computing system 900.

Computer system 900 includes one or more processors (also called central processing units, or CPUs), such as a processor 904. Processor 904 is connected to a communication infrastructure or bus 906.

One or more processors 904 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary aspect, secondary memory 910 may include other means, instrumentalities or other approaches for allowing computer programs and/or other instructions and/or data to be accessed by Computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables Computer system 900 to communicate and interact with any combination of remote devices, remote networks, remote entities, etc. (individually and collectively referenced by reference number 928). For example, communication interface 924 may allow Computer system 900 to communicate with remote devices 928 over communications path 926, which may be wired and/or wireless, and which may include any combination of LANs, WANs, the Internet, etc. Control logic and/or data may be transmitted to and from Computer system 900 via communication path 926.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, Computer system 900, main memory 908, secondary memory 910, and removable storage units 918 and 922, as well as tangible articles of manufacture embodying any combination of the foregoing. Such control logic, when executed by one or more data processing devices (such as Computer system 900), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 9. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer implemented method comprising:
   generating, by one or more computing devices of an autonomous vehicle (AV), a local map update document for a map zone based on AV sensor data indicating road conditions of the map zone, wherein the local map update document is generated using a Cereal binary serialization library;
   receiving, by the one or more computing devices, a map update document for the map zone, wherein the map update document contains attributes of the map zone;
   applying, by the one or more computing devices, more restrictive of the data in the local map update document or the attributes in the map update document to a base map of the AV to generate an updated map based on a conflict between the data and the attributes; and transmitting, by the one or more computing devices, the updated map to one or more downstream modules of the AV configured to use the updated map to operate the AV based on the more restrictive of the data in the local map update document or the attributes in the map update document.

2. The method of claim 1, further comprising when no conflict is found, applying, by the one or more computing devices, the data in the local map update document and the attributes in the map update document to the base map to generate the updated map.

3. The method of claim 1, wherein the transmitting of the updated map to the one or more downstream modules is done based on a subscription model in which the one or more downstream modules subscribe to map client tasks that are configured to push the updated map to the one or more downstream modules when the updated map is generated.

4. The method of claim 3, further comprising transmitting the updated map to the one or more downstream modules in real-time after the updated map is generated.

5. The method of claim 3, further comprising transmitting the updated map to the one or more downstream modules based on a scheduled time interval.

6. The method of claim 1, further comprising updating, by the one or more computing devices, the local map update document in real-time while the AV is operating.

7. A non-transitory computer readable medium including instructions for causing a computing system to perform operations comprising:

generating, by one or more computing devices of an autonomous vehicle (AV), a local map update document for a map zone based on AV sensor data indicating road conditions of the map zone, wherein the local map update document is generated using a Cereal binary serialization library;

receiving, by the one or more computing devices, a map update document for the map zone, wherein the map update document contains attributes of the map zone;

applying, by the one or more computing devices, more restrictive of the data in the local map update document or the attributes in the map update document to a base map of the AV to generate an updated map based on a conflict between the data and the attributes; and transmitting, by the one or more computing devices, the updated map to one or more downstream modules of the AV configured to use the updated map to operate the AV based on the more restrictive of the data in the local map update document or the attributes in the map update document.

8. The non-transitory computer readable medium of claim 7, wherein the operations further comprise when no conflict is found, applying, by the one or more computing devices, the data in the local map update document and the attributes in the map update document to the base map to generate the updated map.

9. The non-transitory computer readable medium of claim 7, wherein the transmitting of the updated map to the one or more downstream modules is done based on a subscription model in which the one or more downstream modules subscribe to map client tasks that are configured to push the updated map to the one or more downstream modules when the updated map is generated.

10. The non-transitory computer readable medium of claim 9, wherein the operations further comprise transmitting the updated map to the one or more downstream modules in real-time after the updated map is generated.

11. The non-transitory computer readable medium of claim 9, wherein the operations further comprise transmitting the updated map to the one or more downstream modules based on a scheduled time interval.

12. The non-transitory computer readable medium of claim 7, wherein the operations further updating, by the one or more computing devices, the local map update document in real-time while the AV is operating.

13. A computing system comprising:
a memory storing instructions;
one or more processors of an autonomous vehicle (AV), coupled to the memory, configured to process the stored instructions to:
generate a local map update document for a map zone based on AV sensor data indicating road conditions of the map zone, wherein the local map update document is generated using a Cereal binary serialization library;
receive a map update document for the map zone, wherein the map update document contains attributes of the map zone;
apply more restrictive of the data in the local map update document or the attributes in the map update document to a base map of the AV to generate an updated map based on a conflict between the data and the attributes; and
transmit the updated map to one or more downstream modules of the AV configured to use the updated map to operate the AV based on the more restrictive of the data in the local map update document or the attributes in the map update document.

14. The computing system of claim 13, wherein the one or more processors are further configured to, when no conflict is found, apply the data in the local map update document and the attributes in the map update document to the base map to generate the updated map.

15. The computing system of claim 13, wherein the one or more processors are further configured to transmit the updated map to the one or more downstream modules based on a subscription model in which the one or more downstream modules subscribe to map client tasks that are configured to push the updated map to the one or more downstream modules when the updated map is generated.

16. The computing system of claim 15, wherein the one or more processors are further configured to transmit the updated map to the one or more downstream modules in real-time after the updated map is generated.

17. The computing system of claim 15, wherein the one or more processors are further configured to transmit the updated map to the one or more downstream modules based on a scheduled time interval.

18. The computing system of claim 13, wherein the one or more processors are further configured to update the local map update document in real-time while the AV is operating.

* * * * *